United States Patent [19]

Thon

[11] Patent Number: 5,030,918
[45] Date of Patent: Jul. 9, 1991

[54] PORTABLE GAUGE FOR MEASURING THICKNESS VARIATIONS OF THIN PLASTIC FILM

[75] Inventor: Jeffrey C. Thon, St. Louis Park, Minn.

[73] Assignee: Modern Controls, Inc., Minneapolis, Minn.

[21] Appl. No.: 437,628

[22] Filed: Nov. 17, 1989

[51] Int. Cl.⁵ ............................................. G01R 27/26
[52] U.S. Cl. ................................... 324/671; 324/674; 324/687; 324/690
[58] Field of Search ............... 324/663, 671, 686, 690, 324/681, 674, 661, 662, 687

[56] References Cited

U.S. PATENT DOCUMENTS

| | | | |
|---|---|---|---|
| 4,103,226 | 7/1978 | Fromson et al. | 324/671 |
| 4,482,860 | 11/1984 | Risko | 324/671 |
| 4,588,943 | 5/1986 | Hirth | 324/687 X |
| 4,820,972 | 4/1989 | Scott et al. | 324/687 |
| 4,841,224 | 6/1989 | Chalupnik et al. | 324/661 X |

FOREIGN PATENT DOCUMENTS

GB2038483B 7/1983 United Kingdom.

Primary Examiner—Kenneth A. Wieder
Assistant Examiner—Robert W. Mueller
Attorney, Agent, or Firm—Paul L. Sjoquist

[57] ABSTRACT

A capacitance gauge system is described for determining the thickness of thin-film non-conducting material (i.e. polyethylene, vinyl, etc.). An elongated capacitance sensing head is applied to one side of the material being measured thereby disturbing the electric field produced by the head. Internal circuitry monitors the effect of the material under test and produces an output proportional to the variation in the material's thickness. A new method of resolving capacitance changes results in the ability to resolve capacitance changes on the order of $5 \times 10^{-17}$ Farads in a linear manner with the benefits of simplicity, excellent stability, low power requirement, and small physical size. These factors allow said apparatus to be incorporated into a small hand-held unit. Because of this advancement in portability, accurate measurements can be made more quickly and conveniently than previously possible.

7 Claims, 2 Drawing Sheets

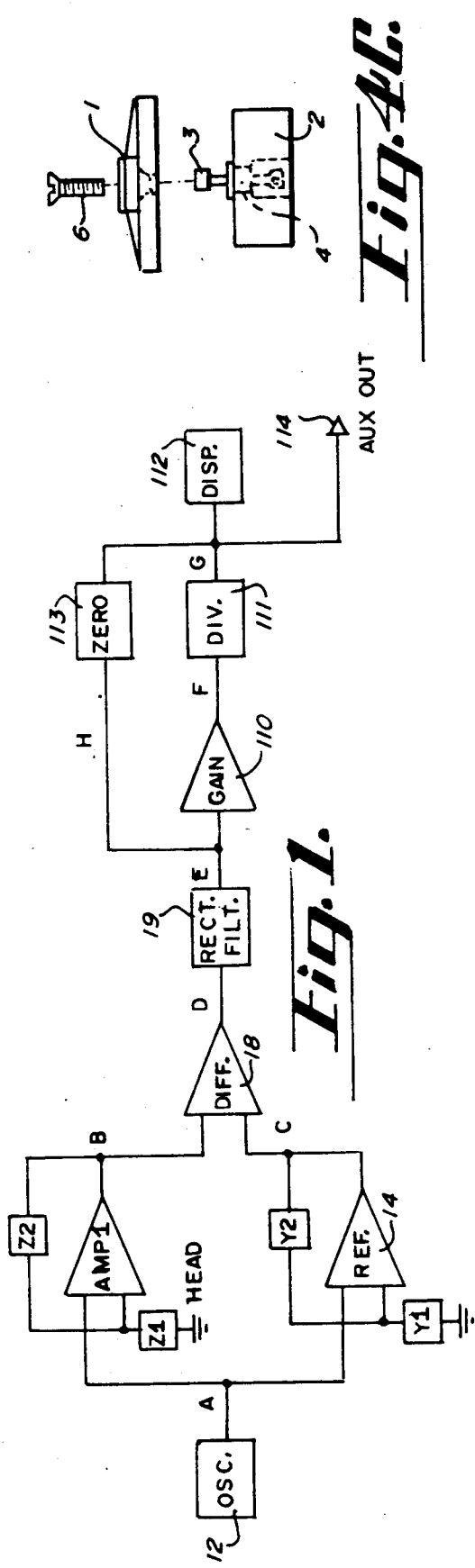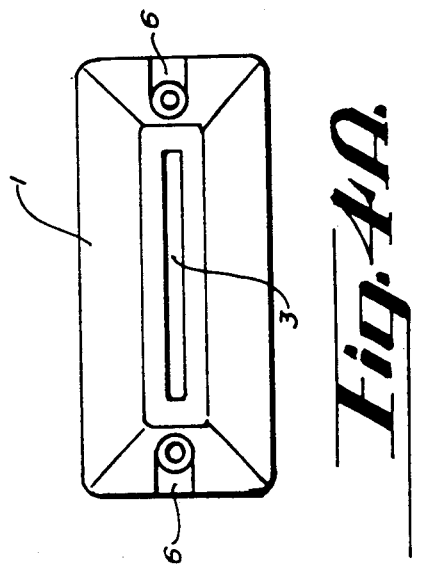
Fig. 4A.
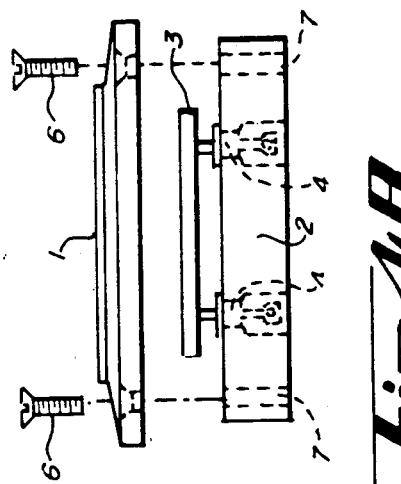
Fig. 4B.

PORTABLE GAUGE FOR MEASURING THICKNESS VARIATIONS OF THIN PLASTIC FILM

CROSS REFERENCE TO CO-PENDING APPLICATIONS

None.

FIELD OF INVENTION

This invention relates to methods and apparatus employed in the production of thin film plastics. Specifically in the field of methods and apparatus involved in determining the thickness of said material as an aid to assuring quality, decreasing waste, and saving time in said production process.

PRIOR ART (1.) Industry needs:

In the manufacture of thin-film plastic, plastic resin is heated and forced through a die where a bubble is formed using compressed air to stretch and cool the material. Said bubble cools as it extends away from the die until it is collected on rollers some distance downline. Since the material is in tubular form, thickness measurements must be made either downline on two thicknesses of collected material or preferably by measuring the material at the bubble from one side with no opposite elements. It is desirable to make measurements at the bubble to facilitate production adjustments before excessive amounts of material have passed downline and to assure quality standards. Further, it is desirable to have a hand-held or portable gauge to conveniently make 'spot' measurements and to facilitate measurements at any point around the circumference of the bubble quickly and easily.

(2.) Prior Art:

Current methods of plastic film measurement is mainly limited to three categories—mechanical, radiation and light, and capacitance.

Mechanical systems generally employ mechanisms that contact the material being measured from both sides and provide a means of deriving thickness from element displacement. An example of this type is the hand micrometer. While generally inexpensive, said systems require access to both sides of the material, may be destructive to the tested material, and have very poor resolution.

Radiation and light systems generally focus radiation or light on the material being measured and make use of physical properties of said material (such as mass or optical qualities) to determine thickness as a function of how said radiation or light is reflected and/or absorbed by said material. Gauges of this category include "beta" gauges, LASER gauges, and infrared gauges. While radiation and light systems allow measurement from one side of a material, such devices are generally bulky, expensive, and, in all cases, are not sensitive enough to provide the needed resolution when used for thin films.

Capacitance devices employ two (or more) elements that form the electrodes of a capacitor. Said elements may be configured so that the material to be measured bridges the gap between said electrodes in a manner such that the material is contacting both elements but the material does not pass between said elements and so the measurement dimension is perpendicular to the plane of the elements thus allowing for measurements to be made from one side of the material with no elements or apparatus opposite. The more traditional method is a configuration where the material is passed between said elements so that the measurement dimension is parallel to the plane formed by said elements and so measurement requires an element on both sides of said material. In both configurations mentioned, the material to be measured is considered a dielectric whose thickness is a direct factor in the total capacitance of the system.

Capacitance systems suffer from many constraints that restrict the design of said systems. The thickness of the material is integrated over the area that the electric field passes so that the plate size must be kept to a minimum to facilitate the detection of minute flaws. The sensitivity of such a system is directly proportional to the plate area so that decreasing plate area also decreases sensitivity. Another consideration is that the one of the capacitance elements should be connected to system ground to reduce stray radiation, to decrease overall capacitance due to system interconnections, and to eliminate static build-up. Another consideration is circuit linearity as most standard capacitance sensitive circuits are non-linear and as such the effects produced by the sensing head are either difficult or impossible to convert to a useful output. Other factors to consider are temperature sensitivity, oscillator stability, circuit size and complexity, and power requirements.

While said capacitance gauges can be made to measure from one side of the material with the resolution necessary, current capacitance devices are generally large and complicated, expensive, difficult to produce, difficult to use, and exhibit poor stability.

There are currently no known truly portable capacitance measuring means for the measurement of thin film plastics.

It is therefore the objective of my invention to provide a substantially improved thin film plastic measurement apparatus. Specifically, the objectives of said invention are to:

1. Provide a gauge with the sensitivity to resolve variations in the measured material on the order of 10 millionths of an inch (0.01 mil).

2. Provide a gauge which is portable and can be held with one hand in order to facilitate more convenient and versatile use.

3. Provide a gauge that is inexpensive.

4. Provide a gauge that exhibits minimal thermal effects.

5. Provide a gauge that can measure from one side of the material in a non-destructive manner.

6. Provide a gauge that operates with a single mid-frequency oscillator and whose head capacitance affects only the amplitude of said oscillator's signal to avoid the inherent problems associated with frequency variable devices.

7. Provide a gauge that overcomes the constraints listed previously and address the industry needs stated previously.

These and other objects of my invention will become apparent from a consideration of the specification, claims, and drawings, in which:

FIG. 1 is a schematic diagram showing the essential functional components of the gauge apparatus;

FIG. 4A is a top view of the sensing head;

FIG. 4B is an exploded side elevation view of the sensing head; and

FIG. 4C is an exploded end elevation view of the sensing head.

Figure 2:
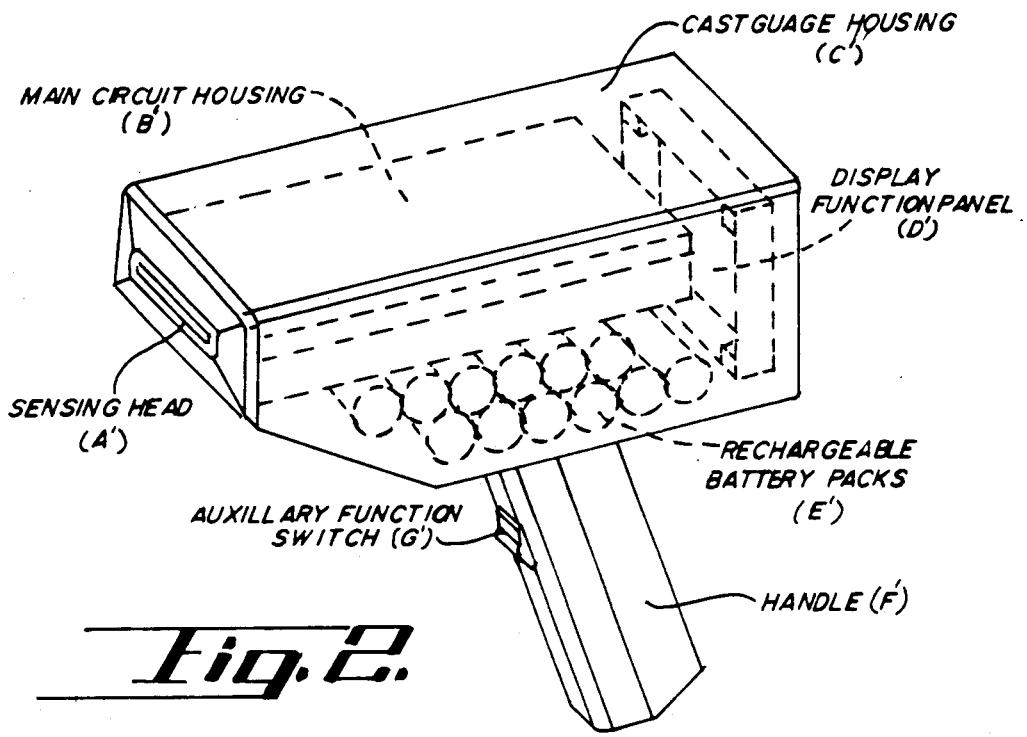
FIG. 2 is a front diagonal elevational view of the packaged apparatus with hidden inside detail shown.

Referring now to the drawings, FIG. 4A is a top view, and FIGS. 4B and 4C are exploded representations of the sensing head apparatus shown from two different angles. This drawing only includes detail pertinent to understanding of said apparatus and does not include detail that facilitates aspects of assembly and package mounting. Character 1 refers to the face plate of said sensing head which is machined to specification from the material Invar (nickel steel) or other conductive material possessing a similar low coefficient of thermal expansion. The shape of said face plate is such that the material to be measured can contact the center portion and remain stationary or move transversely with minimal damaging effect on said material.

Located in the center of the hollow region of face plate 1 is the center electrode shown by character 3. Said electrode is of similar composition as said face plate and is mechanically fixed in position and electrically isolated from the face plate by the electrically insulated mounting posts characterized by 4. The position of said center electrode 1 relative to the face plate 1 is such that the surface of the raised portion of said face plate and the corresponding electrode surface are coplanar and such that there is a uniform air gap between said face plate and the perimeter edges of the center electrode. Said mounting posts 4 provide mounting support to the center electrode and additionally include a soldering terminal on the post opposite the insulation to facilitate system interconnection.

Said mounting posts 4 are mechanically attached into holes drilled through the mounting base shown by character 2. Again, said mounting base is composed of like material as the face plate and center electrode and includes threaded holes shown by character 7 which receive mounting bolts shown by character 6 in order to fix face plate 2 to said base 2.

Referring now to FIG. 1, said sensing head is connected along with a parallel resistor to form the impedance Z1 which, in combination with impedance Z2, comprise gain determining factors for the operation of amp 1. Notice that one side of the sensing head is connected to circuit ground, thus minimizing stray electrical radiation and the parallel resistance serves a dual function of bleeding off any static charge build-up at the sensing head. The circuit associated with amp 1 is replicated approximately by the circuit associated with reference amplifier 14 (includes impedances Y1 and Y2). An oscillator means 12 supplies both amplifier circuits with a sinusoidal signal of medium frequency A which, when amplified by the respective amplifiers, divides into two independent amplified sinusoidal signals B (at the output of amp 1) and C (at the output of the reference amplifier).

The transfer function of amp 1 is given by:

$$B=A[1+(R_2(1/jwC_2)/(R_2+1/jwC_2))/(R_1(1/jwC_1)/(R_1+1/jwC_1))],$$

where:
$R_2$ and $C_2$ combine in parallel to form Z2,
$R_1$ and $C_1$ combine in parallel to form Z1 ($C_1$ is sensing head),
$w = 2*\pi*$frequency, and
j represents an imaginary quantity.

For $R_2 = R_1 = R$, this simplifies to:

$$B = A(1+(jwRC_1+1)/(jwRC_2+1)),$$

and by choosing w and R such that $jwRC_{1,2} >> 1$, the following approximation holds:

$$B = A(1+C_1/C_2).$$

Recalling that $C_1$ is the capacitance of the sensing head, $C_x$ will be used as the additional capacitance due to the presence of material at the head, and by choosing $C_1 = 2*C_2$, the transfer function simplifies to:

$$B = A(3+C_x/C_2).$$

The reference amplifier is configured to have the same configuration and component values as amp 1 and in a similar manner, its transfer function reduces to $C = A*3$.

Difference amplifier 18 produces, at its output, a signal D which is the difference $D=(B-C)=A(3+C_x/C_2)-A(3)=A(C_x/C_2)$. Difference signal D is an alternating current signal and is rectified and filtered to direct current by precision rectifier and active filter stage 19 and is output as signal E. Signal E is then multiplied by gain stage 110 to produce a more useful voltage level F. System calibration is accomplished by a simple voltage divider stage 111 whose output is then the system output G.

Said voltage level G is then monitored by automatic zeroing circuit 113 when said circuit is activated by a toggle switch means (not shown) and produces a correction voltage H to offset drift and errors. While said zeroing circuit 113 is activated, voltage H is continually changed until the monitoring devices determine that voltage level G is less than $+/-0.0005$ volts at which time the circuit is deactivated and level H is maintained. System output G is available to the operator as an auxiliary output 114 and is also used to drive digital panel meter display 112 for convenient monitoring by operator.

FIG. 2 shows a forward diagonal elevational view of the apparatus in packaged form. This useful implementational realization of said apparatus provides functional, protective, decorative, and useful housing of the operational components in a form convenient for use. Sensing head (A') is exposed from the cast gauge housing (C') at the tapered forward end of said housing. Said sensing head (A') is mounted integral to a steel main circuit housing (B') which provides protection, mechanical support, and electromagnetic radiation shielding to the main circuit board. Located beneath said circuit housing (B') and within said cast gauge housing (C') is a NiCad rechargeable battery pack (E'). Located in the opening in the cast gauge housing (C') opposite to the sensing head (A') opening is the display/function panel (D'). Protruding from the base of said cast gauge housing is the handle (F') which facilitates convenient grip of said apparatus by the operator.

Figure 3:
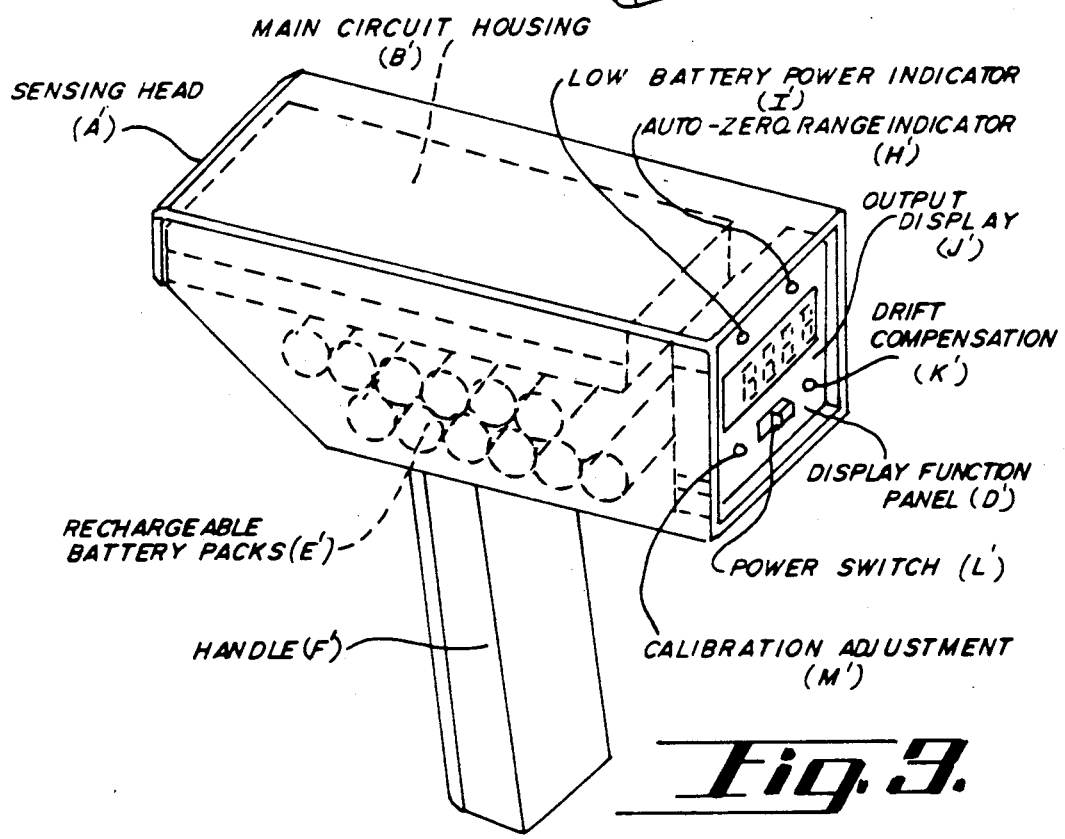
FIG. 3 is a rear diagonal elevational view of the packaged apparatus with hidden inside detail shown.

FIG. 3 is a rear diagonal elevational view of the same apparatus as in FIG. 2. In FIG. 3, features are labeled in the same manner as like features in FIG. 2. Other features revealed in FIG. 3 include detail of said display/function panel (D'), specifically the power switch (L'), calibration adjustment (M'), drift compensation adjustment (K'), digital output display (J'), low battery charge indicator (I'), and the auto-zero range indicator (H').

OPERATION

The apparatus of the preferred embodiment of my invention as previously described can be operated in the following manner.

The apparatus is first calibrated by disposing a known standard of similar dimension and composition as that of the material to be measured across the sensing head. Calibration is achieved by turning the calibration adjustment until the output is as desired. The calibration adjustment simply trims the output to a lower level. For instance, if said known standard is 1.00 mils thick, the output is trimmed until it reaches a level of 100 millivolts, which causes the digital display to read 1.00, corresponding to the 1.00 mil measurement.

In a film extrusion process, the calibrated gauge can then be held by the operator and presented to the moving plastic bubble in any convenient position such that said sensing head contacts said bubble material. The operator may then simply read the current thickness from said display. By moving the gauge around the circumference of said bubble, deviations and flaws can be easily detected and the location on the extruder die from which said flaws originate can readily be found by visually following the path of the flaw back to the die. This ability is not readily accomplished by other measurement means as flaws are detected at great distances from the die and are therefore difficult to trace back to their source.

Because of the versatile nature of the portable apparatus, it can be fixed or transported by mechanical means to relieve the operator and to provide feedback control of the extrusion equipment. The gauge also allows for external monitoring by strip chart recorder or computer equipment to provide a permanent record of the material quality.

It should be readily apparent from this specification that said apparatus represents a considerable improvement over the prior art of film measurement through its inherent simplicity and portability.

I claim:

1. A hand-held apparatus for the measurement of thin film plastic thickness variations, comprising:
   (a) a housing having a projecting handle for grasping by the hand, said housing having a forward end and a rearward end;
   (b) a capacitive sensing head mounted at said housing forward end, said head having a first electrode electrically connected to said housing and having a second electrode insulated from said housing;
   (c) a measurement circuit board mounted in said housing, said circuit board having an oscillator circuit means for producing a signal of predetermined fixed magnitude, and having an amplifier circuit means for receiving said oscillator-produced signal, said amplifier circuit further having an impedance gain circuit connected to said second electrode, whereby the gain of said amplifier circuit means is controlled by the impedance of said capacitance sensing head; and
   (d) a display/control panel mounted to the rearward end of said housing, said display/control panel having an input terminal connected to said amplifier circuit means, and having means for displaying a visual representation of the signal received at said input terminal.

2. The apparatus of claim 1, further comprising a rechargeable battery pack mounted in said housing.

3. A hand-held apparatus for the measurement of thin film plastic thickness variations, comprising:
   (a) a housing having a projecting handle for grasping by the hand, said housing having a forward end and a rearward end;
   (b) a capacitive sensing head mounted at said housing forward end, said sensing head having a conductive plate substantially covering said forward end, said conductive plate being electrically connected to said housing and having an elongated opening therethrough, said sensing head further having an electrode centrally positioned in said elongated opening such that there is a uniform air gap between said electrode and said conductive plate, said electrode mounted on insulated posts and having a conductor passing through at least one of said insulated posts;
   (c) a rechargeable battery pack mounted in said housing; and
   (d) a measurement circuit board mounted in said housing, said measurement circuit board having an amplifier circuit with a gain control circuit, said gain control circuit connected to said electrode conductor, said amplifier circuit having a second electrical terminal connected to said battery pack, a third electrical terminal connected to said housing, and a fourth electrical output terminal;
   (e) a display/control panel mounted to the rearward end of said housing, said panel having an input electrical terminal connected to said amplifier circuit fourth electrical output terminal, and having means for displaying a visual representation of the value of the signal at said input electrical terminal.

4. The apparatus of claim 3, wherein said measurement circuit board further comprises circuit means for translating changes in capacitance of said capacitance sensing head to signals to said means for displaying, to provide a meaningful visual representation of said capacitance changes.

5. The apparatus of claim 4, wherein said measurement circuit board further comprises an oscillator means for producing a signal of predetermined fixed amplitude, and said amplifier circuit further comprises a pair of amplifiers connected to said oscillator means, one of said pair of amplifiers being connected to a reference impedance for setting the gain thereof, and the other of said pair of amplifiers being connected to said capacitance sensing head electrode conductor for setting the gain thereof.

6. The apparatus of claim 5, wherein said pair of amplifiers are connected to a difference amplifier, and the output of said difference amplifier comprises a signal representative of the capacitance of said capacitive sensing head.

7. The apparatus of claim 6, further comprising a rectifier circuit connected to receive the output of said difference amplifier and an adjustable gain amplifier connected to said rectifier circuit.

* * * * *